June 4, 1963  P. DUFF  3,092,286
EXPLOSIVE DIAPHRAGM VALVE
Filed Nov. 28, 1960

INVENTOR
Philip Duff

BY
ATTORNEYS

United States Patent Office 3,092,286
Patented June 4, 1963

3,092,286
EXPLOSIVE DIAPHRAGM VALVE
Philip Duff, San Jose, Calif., assignor, by mesne assignments, to the United States of America as represented by the Secretary of the Navy
Filed Nov. 28, 1960, Ser. No. 72,255
1 Claim. (Cl. 220—47)

This invention relates to a valve and more particularly to a quick opening valve having frangible diaphragms.

Modern technology often requires the use of valve devices exhibiting extremely fast operating characteristics. In addition, a valve of this nature is often required to be leakproof and to be positive in operation. Many conventional valves have been developed and modified in an attempt to satisfy these requirements. However, there is a practical limit to the speed with which any mechanical device can be operated. Additionally, many valves, when in the open position, provide an irregular flow path such that fluids being pumped through the valve structure at extremely high velocity will exhibit a flow pattern disturbed to such an extent by the valve irregularities that cavitation and other undesirable disruptions to smooth fluid flow result. The utilization of a mechanically operated valve also presents the problem of making the valve absolutely leakproof when closed.

In the field of missiles and related hardware, it is required that a valve be capable of completing its duty cycle only once, or at least that following operation of the valve sufficient time is available to provide for a manual resetting of the device to its closed position. It is also in these areas that requirements often develop for a valve having the capabilities of operating within a few milliseconds with absolute reliability of performance on a given signal, and having leakproof qualities and a minimum pressure loss within the opened valve.

The present invention contemplates a valve utilizing two frangible diaphragms, an explosive charge, and a minimum of moving parts to accomplish the desired result.

It is therefore an object of the present invention to provide a quick operating valve.

It is another object to provide a valve with improved reliability of operation.

It is still another object to provide a valve actuated by an explosive force.

A still further object is to provide a valve which will have a minimum pressure loss throughout its configuration.

Yet another object is to provide a valve that will be relatively leakproof prior to valve operation.

Yet another object is to provide an explosive diaphragm valve which may be disassembled and re-set to the closed position in a short period of time and with a minimum of tools.

Other objects and many of the attendant advantages of this invention will be readily appreciated as the same becomes better understood by reference to the following detailed description when considered in connection with the accompanying drawings wherein.

Figure 1:
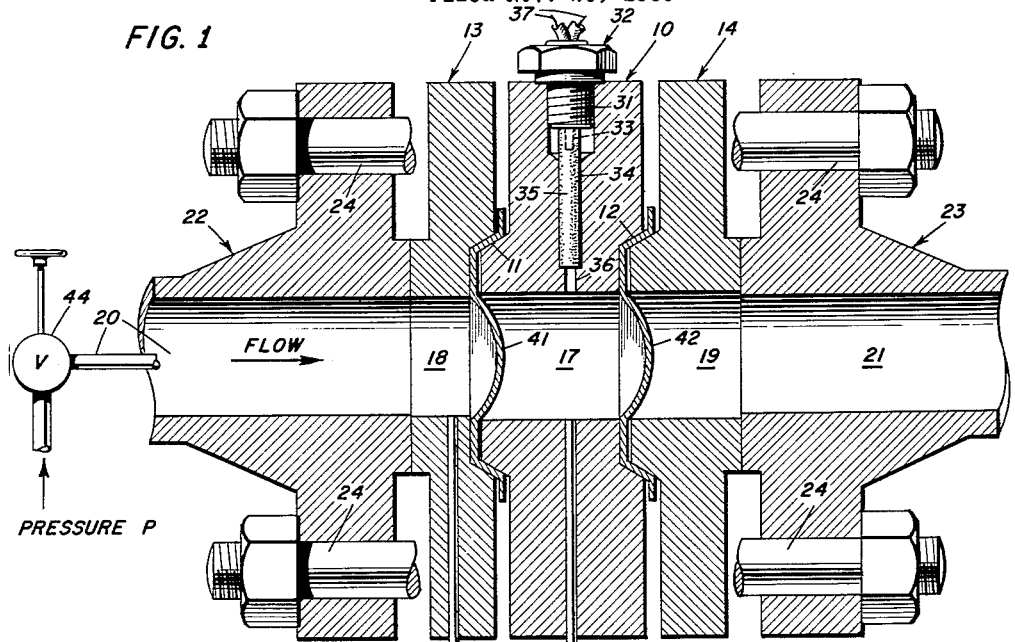
FIG. 1 is a longitudinal cross-section of the instant valve shown in the closed position.

Referring now to FIG. 1 wherein is disclosed a complete valve structure in cross section, it will be seen that the valve includes three metal plates which may be circular in configuration, and which form a section of the pipeline in which it is desired to control fluid flow. A central valve section 10 is provided with machined surfaces 11 and 12 on either side, adapted to mate with similar surfaces on an upstream valve section 13 and a downstream valve section 14. Prior to joining these three sections together frangible diaphragm material, which will be explained in detail hereinafter, is inserted between the junctions of these three plates so that longitudinally bored, centrally located, holes 17, 18 and 19 will be blocked by the diaphragm members. The centrally located hole mentioned above may be positioned within the three plates so that as the plates are brought together the holes are drawn into alignment. It is usually desirable to make the size of the holes 17, 18 and 19 the same as the interior diameter of the pipe in which it is intended to insert the valve structure.

In the particular embodiment illustrated, two pipes 20 and 21 are provided with flanged members 22 and 23 which receive the valve configuration therebetween. The flanged members 22 and 23 include radially positioned holes to receive bolts 24 which extend from one flange, through the three plates of the valve structure, and then through the other flange, so that the entire structure may be drawn together to form a sealed pipe section of continuous cross section. It is noted that for clarity of illustration the bolts 24 are not drawn as extending through the three valve plates, however it is to be understood that the holes may be positioned in these plates so that the assembly may be aligned with the radially positioned holes in the flanges 22 and 23, thereby enabling the bolts 24 to extend through the entire structure so that the pipeline and the valve sections may be maintained in a position of rigid alignment.

From the description thus far presented, it will be seen that after assembly of the three valve sections and the two frangible disk members between sections 20 and 21 of the pipeline, a continuous pipe section will exist, extending from pipe section 20 through the upstream valve section 18, the central valve section 17, and the downstream valve section 19, to pipe section 21, separated by means of the two frangible diaphragms, into an upstream section, a central section, and a downstream section. Apart from the frangible diaphragms however, the pipeline section is one continuous circular opening of uniform diameter which will present no obstructions or discontinuities of the type that would adversely affect fluid flow.

The central valve section contains a circular hole bored in a radial direction extending from the outer periphery of this section to the centrally located pipeline section 17. This hole is bored so as to have three successive sections, each section being of relatively greater diameter as the outer periphery is approached. The outer, and larger in diameter, section 31 is tapped to receive a metallic plug 32. This plug which is threaded and received by the tapped hole 31 acts as a seal at the outer end of the hole 31, and contains at its lower end an explosive detonator 33 and wires 37 which conduct a signal to actuate the detonator. The middle hole section 34 contains an explosive charge 35 the inner end of which rests on the shoulder formed by the smaller diameter, and innermost, hole 36. The opposite end of the explosive charge 35 contacts the detonator 33 in plug 32.

A small diameter pressure equalizer line 40 is provided which extends radially through the upstream valve section and the central valve section so as to connect the two chambers formed on either side of diaphragm 41. A bleed valve 43 is provided so that pressure may be removed from these two sections when desired for maintenance purposes. The pipeline section 20 is provided with a cut-off valve which may be of any type well known in the art and which is used to isolate the valve structure and valve stream pipeline sections from the fluid source when it is desired to install new diaphragms in the valve structure.

The two diaphragms 41 and 42 may be constructed of any frangible material preferably of a flexible composition. The upstream diaphragm 41 is designed to rupture at some pressure less than the pressure maintained by the source of fluid supply in the upstream pipeline. The downstream diaphragm is so designed that it will rupture at some pressure greater than the pressure maintained in the upstream pipeline. In practice, it has been determined that for an upstream pipeline pressure equal to P, one set of values for proper operation is obtained when diaphragm 41 is selected to rupture at a pressure equal to 0.75 P and diaphragm 42 is selected to rupture at a pressure equal to 1.50 P.

In operation, after the diaphragms have been inserted and the valve structure securely bolted together, the valve 44 is slowly opened admitting fluid at pressure P into pipeline section 20 and the upstream valve section 18. This pressure is bled off through equalizing line 40 till the pressure in the central valve section 17 is equal to that of P. At such time, since the pressures in section 18 and section 17 are equal, there will be no force exerted on diaphragm 41. Diaphragm 42, which will not rupture until the pressure exceeds that of P, contains the fluid within the valve and prevents any flow in a downstream direction through the system. When the seals on this diaphragm at the machined surface 12 are drawn tightly together, and the diaphragm material is impervious to the contained fluid, there will be no valve leakage in a downstream direction. At this time the manually operated valve 44 has been completely opened and will in no way further interfere with fluid flow throughout the system.

When it is desired to actuate the valve a signal is transmitted through wires 37 causing detonator 33 to detonate the explosive charge 35. The resultant explosion will create a pressure increase within chamber 17 which will exceed the strain capabilities of the diaphragm 42, causing a rupture. The rupture of diaphragm 42 will immediately release the fluid contained within chamber 17, which, until this time, has been equalizing the pressure in chamber 18 thereby preventing diaphragm 41 from rupturing. Now, since diaphragm 41 will rupture at a pressure less than the pressure P in the upstream pipeline, this diaphragm disintegrates allowing fluid flow through the valve structure and into the downstream pipeline. When the two diaphragms are removed by the aforedescribed sequence of events, the three valve sections form an essentially continuous pipe section connecting the upstream and downstream pipelines. It has been found that this action will take place from the time of the detonating signal, to the time of complete opening of the valve, in a few milliseconds, providing completely positive opening operation and an unbroken path for subsequent smooth fluid flow.

Figure 2:
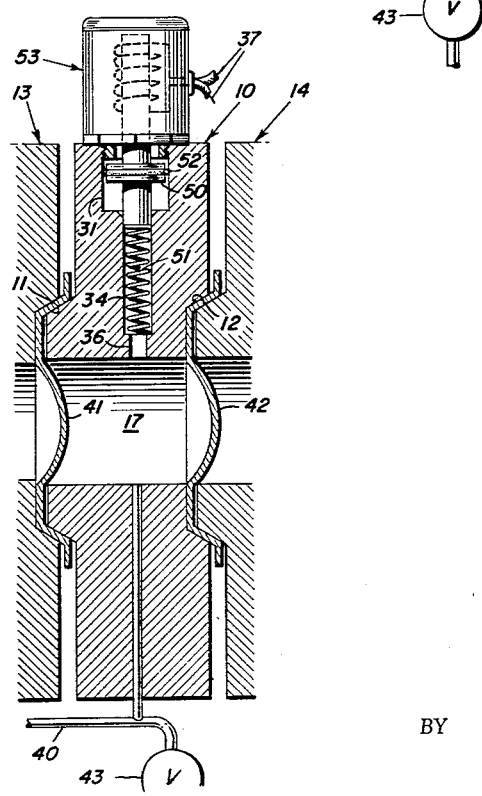
FIG. 2 is an illustration in cross-section of the central portion of FIG. 1 showing a modification thereof particularly adaptable to fluids in the liquid state.

The structure as described above is suitable for use in a system designed to pass any fluid in either a liquid or gaseous state. However, if the fluid is a liquid which is essentially incompressible, the modification of the invention as illustrated in FIG. 2 may be utilized. Here, the explosive charge 35 is replaced by a piston member 50 which is mechanically driven in an inward direction to force the necessary increase in pressure required to rupture diaphragm 42. The piston is provided with a spring 51 which seats against the inner smaller diameter hole and tends to restrain the piston in its outward position. A piston ring 52 is provided about the upper enlarged portion of the piston 50 to prevent any fluid from leaking from chamber 17 past the piston 50 to the outer atmosphere. Any suitable means, illustrated herein as a solenoid 53, but not necessarily so limited, may be provided to force the piston in an inward direction at such time as valve operation is desired. The operation of the particular embodiment disclosed in FIG. 2 is the same as that described above in connection with FIG. 1, apart from the different method of causing the pressure increase in the central valve section which results in a rupture of diaphragm 42 initiating the desired sequence of events.

After valve operation is complete and the full fluid flow has been obtained, it may be desired to replace the diaphragms and reset the valves for future operation. The manual valve 44 may be operated to the closed position and the entire unit then disassembled in a relatively short period of time to replace the two frangible diaphragms.

The bleed pipe 40 is selected to be of relatively small diameter so that pressure equilization between sections 17 and 18 will occur over a relatively longer period of time than is required for a pressure increase in the section 17 resulting from action of either explosive charge 35, shown in FIG. 1, or the plunger 50, shown in FIG. 2. Thus, when the valve 44 is slowly opened the pressure in section 17 will build up with sufficient rapidity to prevent the pressure in section 18 from rupturing diaphragm 41. However, when the valve is actuated by either explosive or mechanical means the pressure increase in section 17 will occur in a substantially instantaneous manner and the pressure limit of diaphragm 42 will be exceeded before the comparatively smaller diameter bleed pipe will be able to contain the pressure increase within section 17.

It will be realized by one skilled in the art that while two particular embodiments of the instant valve structure are shown herein, other methods for rapidly increasing the pressure within a fluid section could be substituted for the mechanical and explosive means disclosed herein.

Obviously many other modifications and variations of the present invention are possible in the light of the above teachings. It is therefore to be understood that within the scope of the appended claim the invention may be practiced otherwise than as specifically described.

What is claimed is:

A quick opening valve for pressurized fluids comprising, in combination;
an input conduit,
an output conduit,
flange means integral with and extending from each of said input and said output conduits,
a first cylindrical valve section abutting said input conduit and in sealed relationship therewith to define a first chamber,
a second cylindrical valve section abutting said first valve section and in sealed relationship therewith to define a second chamber,
a third cylindrical valve section abutting said second valve section and in sealed relationship therewith to define a third chamber,
said sections being arranged in serial order so that the chambers thereof form a continuous tubular passage and are capable of being removed and replaced as a uitary structure without disturbing the input and output conduits,
a pressure pipe inlet in communication with said input conduit for admitting pressure into said first chamber,
a pressure control valve in said inlet pipe and actuated to slowly admit said pressure into the input conduit and the first chamber, said valve being actuated to cut off said pressure during removal and replacement of said sections,
a first diaphragm positioned between said first and second sections to separate the first chamber from the second chamber so that the second chamber receives additional pressure in excess of the pressure therein and in said first chamber,
said first diaphragm being in sealing relationship with the first and second sections and rupturable at a pressure less than designed input pressure,
a second diaphragm positioned between the second and third sections to separate the second chamber from the third chamber,
said second diaphragm being rupturable as the additional pressure in excess of the pressure therein and in the first chamber is applied thereto, said first and second diaphragms being of concave-convex configuration and positioned concave to the direction of pressure flow, a restricted pressure equalizer line connected between the first chamber and the second chamber for porting the input pressure to the first and the second chambers, a pressure control valve in said pressure equalizer line for bleeding-off the input pressure until the pressure in the second chamber is equal to the pressure in the first chamber so that said first diaphragm is prevented from rupturing until the additional pressure is received by said second chamber, a recess in said second section, a bore in communication with said recess and smaller in diameter than the diameter of the recess, a restricted aperture in communication with said bore and the second chamber, a casing threaded into said recess, an electroresponsive device carried by said casing and disposed within said recess, and a pressure producing element confined within said bore and having one end disposed within the recess and receiving said electroresponsive device and operated thereby for producing said additional pressure, the other end of the pressure producing element being disposed at the junction of the aperture and the bore in proximate relationship with the second chamber, said additional pressure being directed through said restricted aperture with sufficient force to rupture the second diaphragm, whereupon the pressure in the first and second chambers are unequalized an amount sufficient to cause the second diaphragm to rupture by the input pressure thereby allowing fluid flow through the valve.

References Cited in the file of this patent

UNITED STATES PATENTS

| | | |
|---|---|---|
| 1,485,913 | Gottlieb | Mar. 4, 1924 |
| 2,436,364 | McDowell | Feb. 17, 1948 |
| 2,474,826 | Contlin | July 5, 1949 |
| 2,580,365 | Simmonds | Dec. 25, 1951 |
| 2,788,794 | Holinger | Apr. 16, 1957 |
| 2,895,492 | Bell | July 21, 1959 |
| 2,947,315 | Connell | Aug. 2, 1960 |
| 2,972,998 | Detwiler | Feb. 28, 1961 |